United States Patent
Hirata et al.

(10) Patent No.: US 8,864,435 B2
(45) Date of Patent: Oct. 21, 2014

(54) TURNOVER DEVICE OF LIQUID CRYSTAL PANEL

(75) Inventors: Satoshi Hirata, Ibaraki (JP); Seiji Kondo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 349 days.

(21) Appl. No.: 13/481,343

(22) Filed: May 25, 2012

(65) Prior Publication Data

US 2012/0300377 A1  Nov. 29, 2012

(30) Foreign Application Priority Data

May 27, 2011  (JP) .................................. 2011-118563

(51) Int. Cl.
*G02F 1/13* (2006.01)
*B65G 47/248* (2006.01)
*B65G 49/06* (2006.01)

(52) U.S. Cl.
CPC ............ *G02F 1/1303* (2013.01); *B65G 47/248* (2013.01); *B65G 49/061* (2013.01); *B65G 49/067* (2013.01)
USPC ............................. 414/761; 414/764; 414/773

(58) Field of Classification Search
USPC .......... 198/404, 406; 414/351, 758, 763, 764, 414/765, 767, 771, 773, 775, 776, 779, 783, 414/936, 937
See application file for complete search history.

(56) References Cited

U.S. PATENT DOCUMENTS

| | | | | |
|---|---|---|---|---|
| 1,967,719 A | * | 7/1934 | Morgan | 414/419 |
| 2,160,581 A | * | 5/1939 | Behnke | 15/94 |
| 3,071,257 A | * | 1/1963 | Jones et al. | 414/767 |

(Continued)

FOREIGN PATENT DOCUMENTS

| | | |
|---|---|---|
| EP | 2 216 277 A1 | 8/2010 |
| EP | 2 309 313 A1 | 4/2011 |

(Continued)

OTHER PUBLICATIONS

Extended European Search Report dated Dec. 4, 2012 and issued in corresponding European Patent Application No. 12169545.6.

*Primary Examiner* — Gregory Adams
(74) *Attorney, Agent, or Firm* — Westerman, Hattori, Daniels & Adrian, LLP (57) ABSTRACT

A turnover device of a liquid crystal panel which comprises: a panel holding portion including a base, a panel face supporting portion having plural pairs of panel face touching portions to support both panel faces of a liquid crystal panel, a supporting arm of a panel long edge having a long edge touching portion to support a long edge of the panel, and a supporting arm of a panel short edge having a short edge touching portion to support a short edge of the panel; and a driving portion including a rotation shift to form a right angle with a bisector to divide an angle formed by the long edge touching portion and the short edge touching portion, and an actuator for turnover to rotate and drive the rotation shaft.

6 Claims, 5 Drawing Sheets

(56) References Cited

U.S. PATENT DOCUMENTS

| | | | | |
|---|---|---|---|---|
| 3,106,301 | A | * | 10/1963 | Jeddeloh .................. 414/758 |
| 3,367,517 | A | * | 2/1968 | Dallape et al. ............. 414/761 |
| 3,547,279 | A | * | 12/1970 | Radomski .................. 414/765 |
| 3,710,955 | A | * | 1/1973 | Redman et al. ............. 414/765 |
| 4,064,016 | A | * | 12/1977 | Vortmann .................. 198/412 |
| 4,344,727 | A | * | 8/1982 | Chaloupka ................. 414/789.1 |
| 4,573,863 | A | * | 3/1986 | Picotte ..................... 414/763 |
| 7,022,204 | B2 | | 4/2006 | Kanbara et al. |
| 7,543,621 | B2 | | 6/2009 | Kanbara et al. |
| 2010/0272550 | A1 | * | 10/2010 | Ishihara et al. ............. 414/777 |
| 2011/0104423 | A1 | | 5/2011 | Kitada et al. |
| 2012/0071058 | A1 | | 3/2012 | Hirata et al. |

FOREIGN PATENT DOCUMENTS

| | | |
|---|---|---|
| EP | 2 431 799 A1 | 3/2012 |
| JP | 11-278649 A | 10/1999 |
| JP | 2005-37417 A | 2/2005 |
| KR | 10-2011-0021290 A | 3/2011 |
| WO | WO 2009044526 A1 * | 4/2009 |

* cited by examiner

TURNOVER DEVICE OF LIQUID CRYSTAL PANEL

BACKGROUND OF THE INVENTION

1. Field of the Invention

The present invention relates to a turnover device of a liquid crystal panel configured to turn over a liquid crystal panel in a horizontal position.

2. Description of Related Art

Conventionally, a turnover device of a liquid crystal panel for turning over the liquid crystal panel in a horizontal position is used when an optical functional film including a polarizing film is bonded on each side of the liquid crystal panel, for instance, in a production line of a liquid crystal display device (Typically, JP 2005-37417 A, paragraphs [0037] to [0044] and FIG. 6 to FIG. 9).

This turnover device is capable of bonding optical functional films to both sides of the liquid crystal panel from one direction side only of the liquid crystal panel by bonding an optical functional film to one panel surface of the liquid crystal panel and then turning over the liquid crystal panel to bond an optical functional film to the other panel face, resulting in downsizing of the production line.

SUMMARY OF THE INVENTION

Conventional turnover devices of liquid crystal panels, however, turned over rectangle-shaped liquid crystal panels by rotating the liquid crystal panels about a horizontal shaft parallel to long edges or short edges thereof. This added own weight of the liquid crystal panels in a vertical raised position to only the long edges or the short edges when turning over the panels, resulting in fears to cause cracks and missing in edges of the liquid crystal panels (long edges or short edges). There was a problem that such generation of missing of the edges of the panels or the like became prominent as the liquid crystal panels became larger.

To solve the above-described problem with the conventional turnover devices for liquid crystal panels, an object of the present invention is to provide a turnover device of a liquid crystal panel capable of controlling the generation of missing of the edges of the liquid crystal panel at the time of turning over the panel.

The summary of the present invention is as follows:

In a first preferred aspect, a turnover device of a liquid crystal panel configured to turn over a rectangle-shaped liquid crystal panel in a horizontal position according to the present invention which comprises: a panel holding portion configured to hold the liquid crystal panel; and a driving portion configured to rotate the panel holding portion about a horizontal shaft, in which the panel holding portion includes: a base; a panel face supporting portion attached to the base, the panel face supporting portion having a pair of or plural pairs of panel face touching portions being opposed to each other configured to support both panel faces of the liquid crystal panel; a supporting arm of a panel long edge attached to the base, the supporting arm having a long edge touching portion configured to support a long edge of the liquid crystal panel along the long edge; and a supporting arm of a panel short edge attached to the base, the supporting arm having a short edge touching portion configured to form a right angle with the long edge touching portion of the supporting arm of the panel long edge and support a short edge of the liquid crystal panel along the short edge, the driving portion includes: a rotation shaft attached to the base of the panel holding portion configured to form a right angle with a bisector to divide an angle formed by the long edge touching portion of the supporting arm of the panel long edge and the short edge touching portion of the supporting arm of the panel short edge; and an actuator for turnover configured to rotate and drive the rotation shaft.

In a second preferred aspect of the turnover device according to the present invention, the panel face supporting portion of the panel holding portion includes an opening and closing system configured to open and close by causing the pair of or the plural pairs of the panel face touching portions to relatively approach and distance.

In a third preferred aspect of the turnover device according to the present invention, the opening and closing system comprises: a link member rotatably supported in the base of the panel holding portion; a movable member attached to a rotation end of the link member, which has the panel face touching portions; and an opening and closing actuator attached to the base, which is configured to rotate and drive the link member.

In a fourth preferred aspect of the turnover device according to the present invention, the panel face touching portions are respectively composed of a rotator rotatably supported in the panel face supporting portion.

ADVANTAGES OF THE INVENTION

According to the turnover device of the present invention, the rotation shaft configured to rotate the panel holding portion configured to hold the liquid crystal panel is positioned at right angles relative to a bisector to divide an angle formed by the long edge touching portion of the supporting arm of the panel long edge and the short edge touching portion of the supporting arm of the panel short edge located in the panel holding portion. Accordingly, it is possible for the turnover device to simultaneously support the long edge and the short edge of the liquid crystal panel at the long edge touching portion and the short edge touching portion and disperse the own weight of the liquid crystal panel to both of the long edge and the short edge when turning over the panel. This makes it possible to control the missing of the edges of the panel or the like at the time of turning over the panel, even when the panel grows in size.

Further, the turnover device of the present invention is capable of simultaneously positioning the liquid crystal panel because the long edge and the short edge of the panel simultaneously come into contact with the supporting arm of the panel long edge and the supporting arm of the panel short edge at the time of turning over the panel. This enables simplification of processes of the production line without newly positioning the panel in a panel long edge direction and in a panel short edge direction.

In addition, the turnover device of the present invention is capable of causing the direction of the long edge of the panel after turning over the panel to be orthogonal to the direction of the long edge of the panel before turning over the panel. Therefore, in the production line of a liquid crystal display device in which polarizing films are bonded to each of both sides of the panel in the state of crossed Nichol prism by orthogonalizing in an absorption shaft direction on both sides, it is possible to arrange two roll bonding devices configured to bond the panel faces in a straight line along the production line while reeling out the polarizing film wound, resulting in downsizing of the production line.

For a full understanding of the present invention, reference should now be made to the following detailed description of the preferred embodiments of the invention as illustrated in the accompanying drawings.

BRIEF DESCRIPTION OF THE DRAWINGS

FIGS. 4 (*a*) and 4 (*b*) are respectively a schematic side view of a panel holding portion in a turnover device of a liquid crystal panel of still another embodiment of the present invention. FIG. 4 (*a*) indicates the state in which panel face touching portions are opened and FIG. 4 (*b*) indicates the state in which the panel face touching portions are closed;

DESCRIPTION OF THE PREFERRED EMBODIMENTS

The preferred embodiments of the present invention will now be described with reference to FIGS. 1 to 8 of the drawings. Identical elements in the various figures are designated with the same reference numerals.

Figure 1:
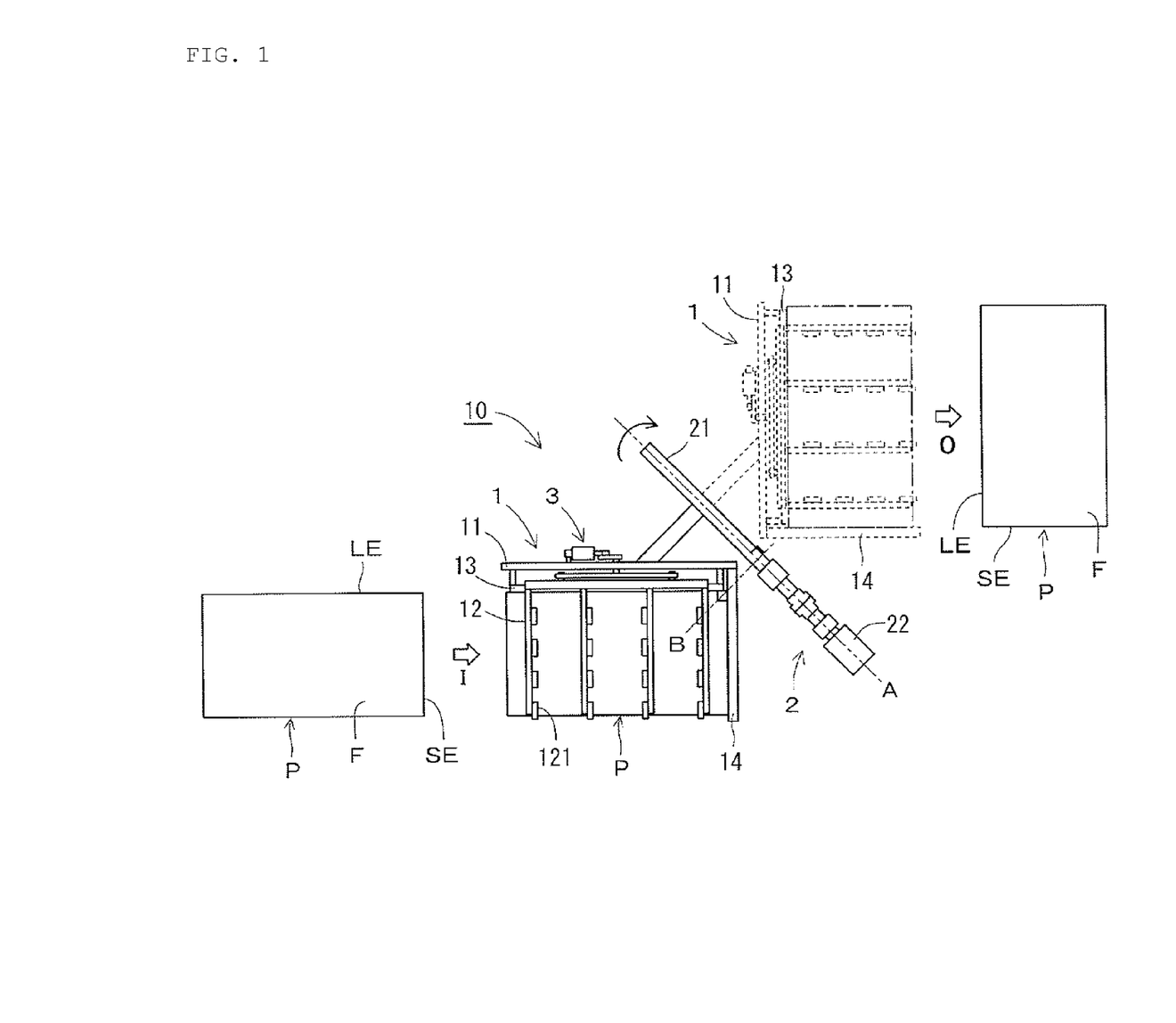
FIG. 1 is a schematic whole plan view of a turnover device of a liquid crystal panel of one embodiment of the present invention.

As shown in FIG. 1, a turnover device 10 of a liquid crystal panel of the present invention essentially comprises: a panel holding portion 1 configured to hold a liquid crystal panel P in a horizontal position; and a driving portion 2 configured to rotate the panel holding part 1 about a horizontal shaft. The panel holding portion 1 holds the rectangle-shaped liquid crystal panel P carried-in by an upstream conveyor not shown while keeping the horizontal position. And the held liquid crystal panel P is rotated by the driving portion 2 to be turned over. After the turning over, the panel P is carried-out by a downstream conveyor not shown while keeping the horizontal position.

Figure 2:
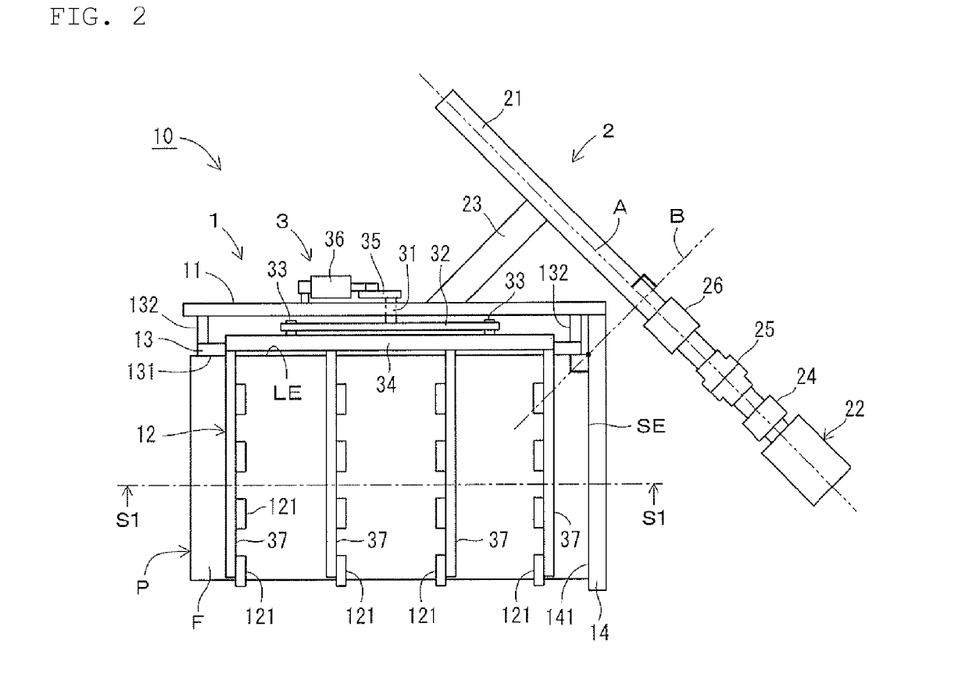
FIG. 2 is a whole plan view of a turnover device of a liquid crystal panel of another embodiment of the present invention.
Figure 3:
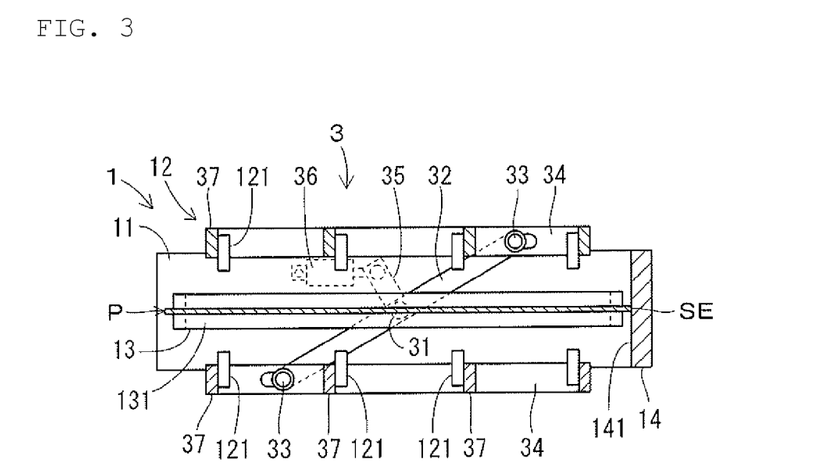
FIG. 3 is a cross-sectional view taken on a S1-S1 arrow of FIG. 2.
Figures 4A, 4B:
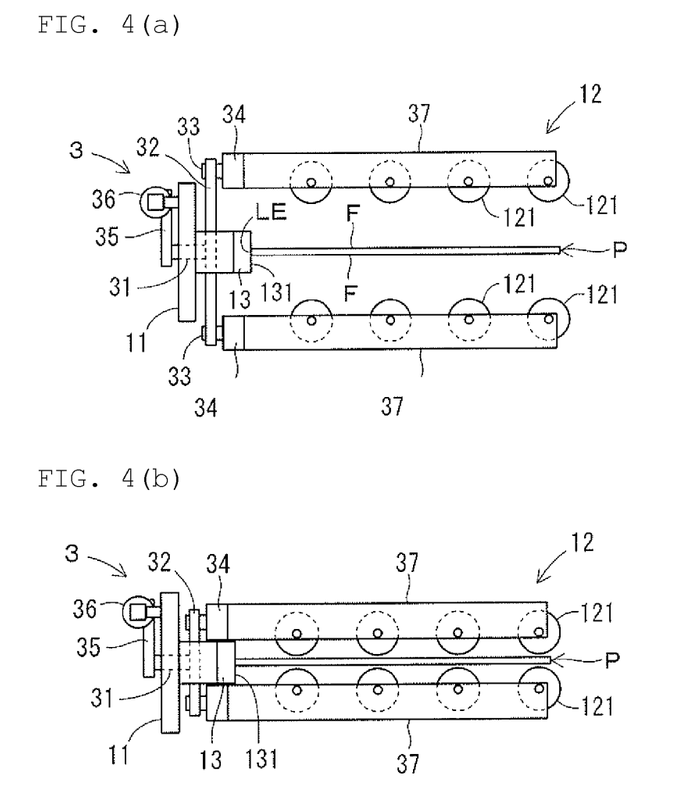

As shown in FIGS. 2 to 4, the panel holding portion 1 includes: a long-plate shaped base 11; a panel face supporting portion 12 attached to the base 11, which is configured to support both sides of panel faces F•F of the liquid crystal panel P; a supporting arm 13 of a panel long edge fixed to the base 11, which is configured to support one long edge LE of the panel P; and a supporting arm 14 of a panel short edge fixed to the base 11, which is configured to support one short edge SE of the panel P.

As shown in FIGS. 3 and 4, the panel face supporting portion 12 has plural pairs of panel face touching portions 121 opposed to each other to directly support the both sides of the panel faces F•F of the liquid crystal panel P. The plural pairs of panel face touching portions 121 are respectively composed of a rotator rotatably supported by a plurality of brackets 37 to support the panel face F of the panel P to be dependent-rotated.

Further, the panel face supporting portion 12 of the present invention includes an opening and closing system 3 configured to open and close the plural pairs of the panel face touching portions 121 by relatively causing the panel face touching portions 121 to approach and distance. As shown in FIGS. 2 and 3, the opening and closing system 3 includes: a link member 32 rotatably supported at the base 11 of the aforementioned panel holding portion 1 by a shaft 31; a movable portion 34 rotatably supported at a rotation end of the link member 32 by a shaft 33; and an opening and closing actuator 36 attached to the base 11, which is composed of an air cylinder configured to drive and rotate about the link member 32 via the shaft 31 and a lever 35.

As shown in FIG. 3, the link member 32 is rotatably supported by the shaft 31 in the central portion thereof and a pair of upper and lower long plate-shaped movable members 34 opposed to each other slidably movable and supported by the shaft 33 at both ends thereof. Such a pair of movable members 34 are configured to approach and distance by a slide guide attached to the base 11 not shown in the figure while keeping a mutual parallel relation. A plurality of brackets 37 are provided in a protrusion condition parallel to each other in each movable member 34. And the panel face touching potions 121 respectively composed of a rotator are rotatably supported at each of the plurality of brackets 37.

As shown in FIGS. 4(*a*) and 4(*b*), it is possible to open and close and move the panel face touching portions 121 opposed to each other at desired opening and closing intervals and timing by appropriately operating the opening and closing actuator 36 of the opening and closing system 3. This makes it possible to stably hold the liquid crystal panel P in a direction vertical to the panel face F.

As shown in FIGS. 2 to 4, the supporting arm 13 is fixed along a longitudinal direction of the aforementioned base 11 via a stay 132 and integrally has a long edge touching portion 131 configured to support end faces of one long edge LE of the liquid crystal panel P.

As shown in FIGS. 2 and 3, the supporting arm 14 is directly fixed to one end in the longitudinal direction of the aforementioned base 11 and integrally has a short edge touching portion 141 configured to support end faces of one short edge SE of the liquid crystal panel P. The short edge touching portion 141 forms a right angle relative to the long edge touching portion 131 of the supporting arm 13. This enables to simultaneously support the one long edge LE and the one short edge SE of the panel P adjacent to each other with the supporting arm 13 and the supporting arm 14. As a result, it is possible to stably hold the panel P in a face direction of the panel face F.

As shown in FIG. 2, the driving portion 2 of the turnover device 10 includes: a rotation shaft 21 attached to the base 11 of the aforementioned panel holding portion 1; and an actuator 22 for turnover configured to rotate and drive the rotation shaft 21.

The rotation shaft 21 is rotatably supported by a bearing not shown while keeping the horizontal position and is fixed by connecting to the base 11 of the panel holding portion 1 via a connecting member 23. Shaft center A of the rotation shaft 21 forms a right angle with a bisecter B to divide an angle (right angle) formed by the long edge touching portion 131 of the aforementioned supporting arm 13 and the short edge touching portion 141 of the aforementioned supporting arm 14.

The actuator 22 for turnover is composed of a servomotor and is coupled to the rotation shaft 21 via a reducer 24 and a shaft coupling 25. It is possible to rotate and drive the rotation shaft 21 at a rotation angle, a rotation speed, in a rotation direction, and at a timing desired employing the appropriate controlling of the actuator 22 for turnover composed of a servomotor in accordance with a detected signal of a rotation position detective sensor 26 attached to the rotation shaft 21. This results in appropriate turning over of the panel holding portion 1.

Turnover operation of the liquid crystal panel P performed by the turnover device 10 of the liquid crystal panel will now be described as below.

As shown in FIG. 1, in the turnover device 10, the supporting arms 13 and 14 in the panel holding portion 1 thereof are horizontalized to cause the turnover device 10 to stand by in a state in which the up and down plural pairs of panel face touching portions 121 of the panel face supporting portion 12 are opened.

And the liquid crystal panel P in the horizontal position is carried in between the plural pairs of panel face touching portions 121 in the open state by an upstream conveyor not shown. While a carry-in direction I of the panel P is parallel to the supporting arm 13 in the panel holding portion 1 and one short edge SE is carried forward of a carrier direction, a carry-in direction of the panel P may be parallel to the supporting arm 14 in the panel holding portion 1 and one long edge LE may be carried forward of the carrier direction.

Next, the panel face touching portions 121 are closed by operating the opening and closing system 3 to hold the panel P at the panel holding portion 1 in the horizontal position. At this time, both sides of the panel P are not necessarily needed to be sandwiched between the panel face touching portions 121, however, for instance, the lower-sided panel face F of the panel P may be supported by lower-sided panel face touching portions 121 and may have a clearance between the upper-sided panel face F and the upper-sided panel face touching portions 121.

Figure 5:
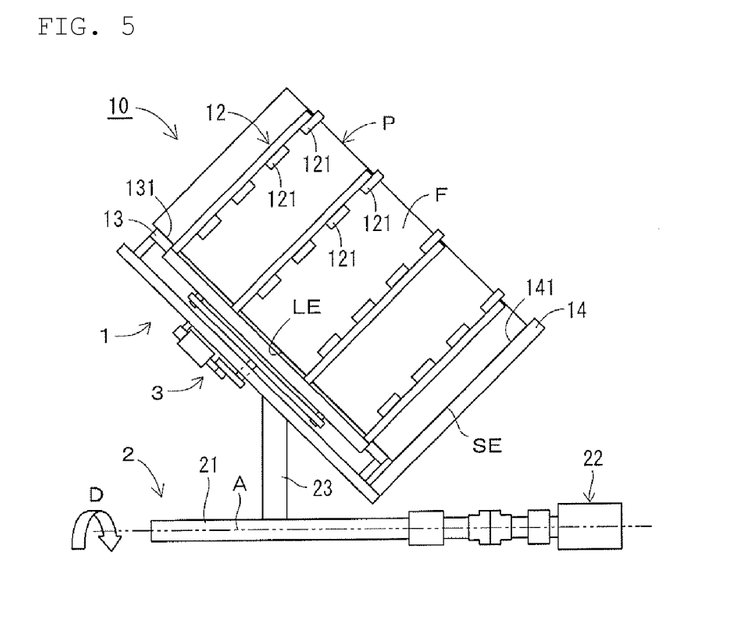
FIG. 5 is a side view indicating the state in which the liquid crystal panel is raised in a vertical position when turning over the panel by a turnover device of a further embodiment of the present invention.

Subsequently, the operation of the driving portion 2 makes it possible to rotate 180 degrees the panel holding portion 1 configured to hold the panel P around the rotation shaft 21. As shown in FIG. 5, this rotation is performed in a direction D where the panel holding portion 1 passes through an upper part of the rotation shaft 21 of the driving portion 2. During the rotation, in the panel P, both sides of the panel face F are supported by the plural pairs of panel face touching portions 121 of the panel face supporting portion 12 and then the lower-sided one long edge LE is supported by the long edge touching portion 131 of the supporting arm 13. Further, the lower-sided one short edge SE is supported by the short edge touching portion 141 of the supporting arm 14. The panel P is thereby turned over while being held at the panel holding portion 1.

Moreover, the interval among the respective panel face touching portions 121 of the panel face supporting portion 12 may be changed by the operation of the opening and closing system 3 during the turnover of the liquid crystal panel P. Typically, the interval among the panel face touching portions 121 may be greater than the thickness of the panel P to ensure that the long edge LE and the short edge SE of the panel P come into contact with the supporting arm 13 and the supporting arm 14 when the panel P in the horizontal position is turned into a vertical position. In addition, both sides of the panel P may be sandwiched by the panel face touching portions 121 to prevent the panel P held by the panel face supporting portion 12 from being misaligned when the panel P in the vertical position is turned into the horizontal position.

As shown in FIG. 1, after the turnover of the panel P, the plural pairs of panel face touching portions 121 are opened by operating the opening and closing system 3 and then the panel P is carried out of the plural pairs of panel face touching portions 121 in the open state by a downstream conveyor not shown. A carry-out direction O of the panel P is herein parallel to the supporting arm 14 of the panel holding portion 1 after the turnover. And the one long edge LE is carried out backwardly of the carry-out direction. The carry-out direction of the panel P may be, however, parallel to the supporting arm 13 in the panel holding portion 1 and the one short edge SE may be carried out backwardly of the carry-out direction.

After the carrying-out of the panel P, the driving portion 2 is activated to rotate 180 degrees the panel holding portion 1 about the rotation shaft 21 in a direction opposite to the rotation shaft 21 or in a direction toward the rotation shaft 21 so as to restore the turnover device 10 of the present invention to the aforementioned standby state.

As mentioned above, in the turnover device 10 of the present invention, the rotation shaft 21 of the driving portion 2 to rotate the panel holding portion 1 forms a right angle with the bisector B to divide an angle formed by the long edge touching portion 131 of the supporting arm 13 and the short edge touching portion 141 of the supporting arm 14 in the panel holding portion 1. Accordingly, as shown in FIG. 5, it is possible to simultaneously support the one long edge LE and the one short edge SE of the vertical positioned panel P using the long edge touching portion 131 of the supporting arm 13 and the short edge touching portion 141 of the supporting arm 14 at the time of the panel turnover. And it is possible to disperse the own weight of the panel P into both the one long edge LE and the one short edge SE. This leads to control the generation of missing or the like of the edges of the panel P at the time of the panel turnover, even when the panel P becomes large.

In addition to that, since the one long edge LE and the one short edge SE of the vertical positioned panel P simultaneously come into contact with the supporting arm 13 and the supporting arm 14, it is possible to simultaneously perform positioning of the panel P when turning over the panel P. Unlike conventional turnover devices, the turnover device 10 of the present invention does not need to newly perform positioning in a long edge direction and a short edge direction of the panel P after the turnover of the panel P. This makes it possible to simplify the processes of the production line.

Figure 6:
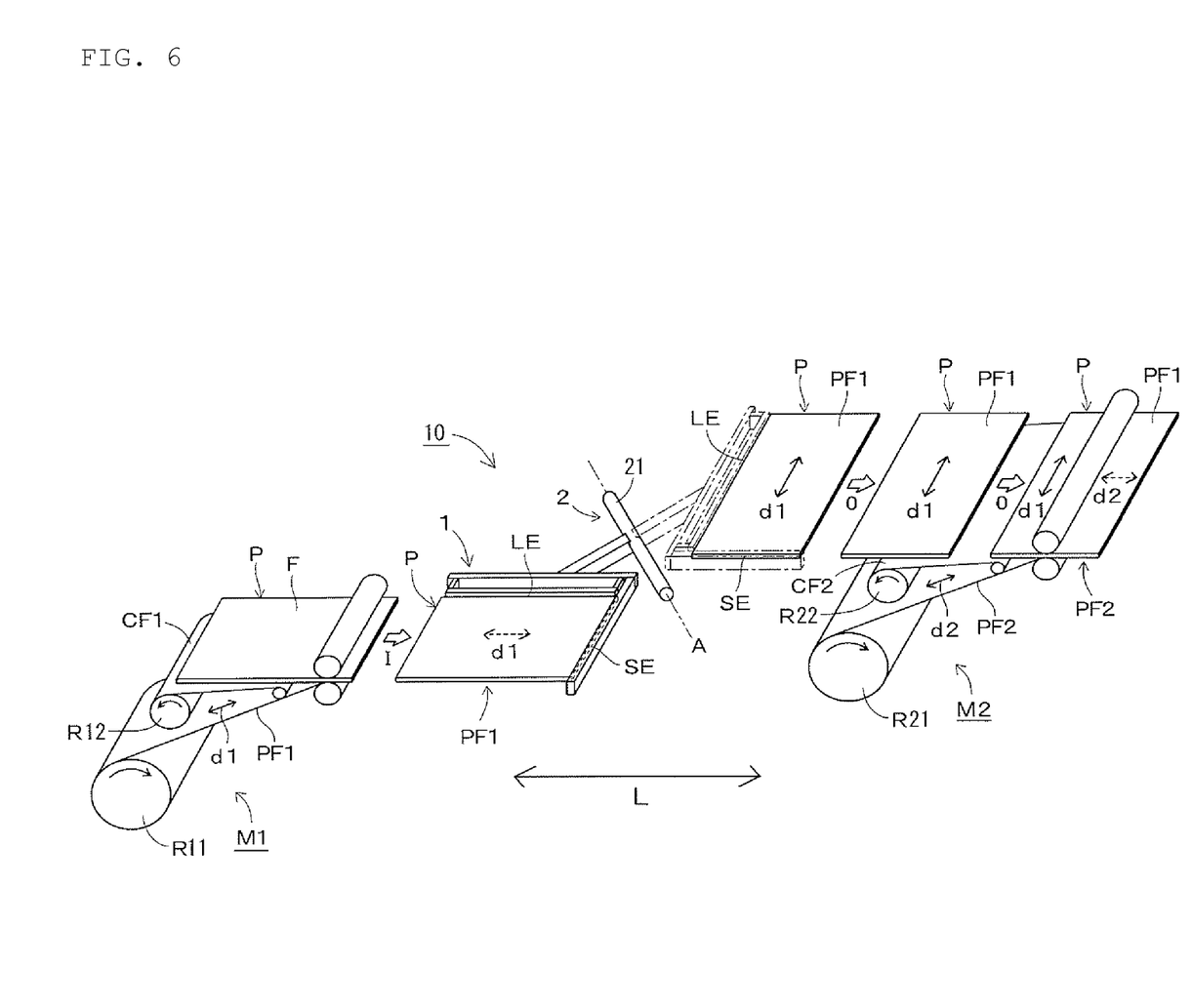
FIG. 6 is a schematic perspective view indicating a part of a production line of a liquid crystal display device applying the turnover device of still further embodiment of the present invention.

Further, in the turnover device 10 of the present invention, the rotation shaft 21 forms a right angle with the bisector B to divide the angle formed by the long edge touching portion 131 and the short edge touching portion 141, therefore, as shown in a schematic view of FIG. 6, this enables the direction of the long edge LE of the panel P after the turning over of the panel P to become orthogonal to the direction of the long edge LE of the panel P before the turning over of the panel P. In other words, according to the turnover device 10, it is possible to simultaneously turn over the both sides of the panel P by 180 degrees and rotate 90 degrees the directions of the panel P (directions of the long edge LE and the short edge SE).

Consequently, as shown in FIG. 6, according to the turnover 10 of the present invention, it is possible to linearly arrange the total two roll bonding devices (M1, M2) capable of bonding wound polarizing films (PF1, PF2) to panel faces while reeling out the wound polarizing films (PF1, PF2) in a production line L of a liquid crystal display device configured to bond the polarizing films (PF1, PF2) to both sides of the panel P in the state of crossed Nichol prism so as to orthogonalize absorption shaft directions (d1, d2) to each other. This makes it possible to reduce the size in the production Line L.

In FIG. 6, symbols CF1 and CF2 indicate release films previously bonded to bonding faces of the polarizing films (PF1, PF2). The roll bonding devices (M1, M2) reel out the polarizing films (PF1, PF2) with release films (CF1, CF2) from supply rolls (R11, R21) to bond the polarizing films (PF1, PF2) to each panel face of the panel P while peeling off the release films (CF1, CF2). The release films (CF1, CF2) peeled off from the polarizing films (PF1, PF2) are wound up by wind-up rolls (R12, R22).

In the case of a conventional turnover device of a liquid crystal panel (for instance, JP 2005-37417 A), a rectangle-shaped liquid crystal panel is rotated about a horizontal shaft parallel to a long edge thereof or a short edge thereof to be turned over, so that the long edge and the short edge of the liquid crystal panel P is parallel to each other before and after the turnover of the panel. Accordingly, in the case where polarizing films were bonded to both sides of the liquid crystal panel in the state of crossed Nichol prism, it was necessary to separately install a swing device configured to rotate 90 degrees the liquid crystal panel in the horizontal position state about a vertical shaft as well as the turnover device. Moreover, it was also necessary to increase the number of processes. There is neither need to install a swing device on the turnover device 10 of the present invention nor problems which cause an increase in the number of the processes.

The turnover device 10 of the present invention is capable of appropriately changing the interval of the respective panel face touching portions 121 because the panel face supporting portions 12 of the panel holding portion 1 have the opening and closing system 3 configured to move the plural pairs of panel face touching portions 121 in the opening or the closing state. Typically, this makes it possible to smoothly perform carry-in operation of the panel P to the panel holding portion 1 or carry-out operation of the panel P from the panel holding portion 1. And it is possible to ensure that the positioning of the panel P at the time of the turnover is performed and to subsequently prevent the panel P from being misaligned.

While a preferred embodiment of the turnover device 10 of the present invention has been described so far, the present invention can be embodied in other embodiments.

For instance, in the aforementioned embodiment of the present invention, the panel face supporting portion 12 of the panel holding portion 1 has the opening and closing system 3 to cause the both sides of the panel face touching portions 121 opposed to each other to approach and distance using the opening and closing system 3. The panel face touching portions 121 opposed to each other may, however, relatively approach and distance, alternatively, only one panel face touching portion 121 may be moved relative to the other panel face touching portion 121.

Further, in the aforementioned embodiment of the present invention, while a linkage composed of the link member 32 is used as the opening and closing system 3, other moving system, such as a rack and pinion system may be employed. As well as an air cylinder, a motor may be used as the opening and closing actuator 36 configured to drive the opening and closing system 3.

Figure 7:
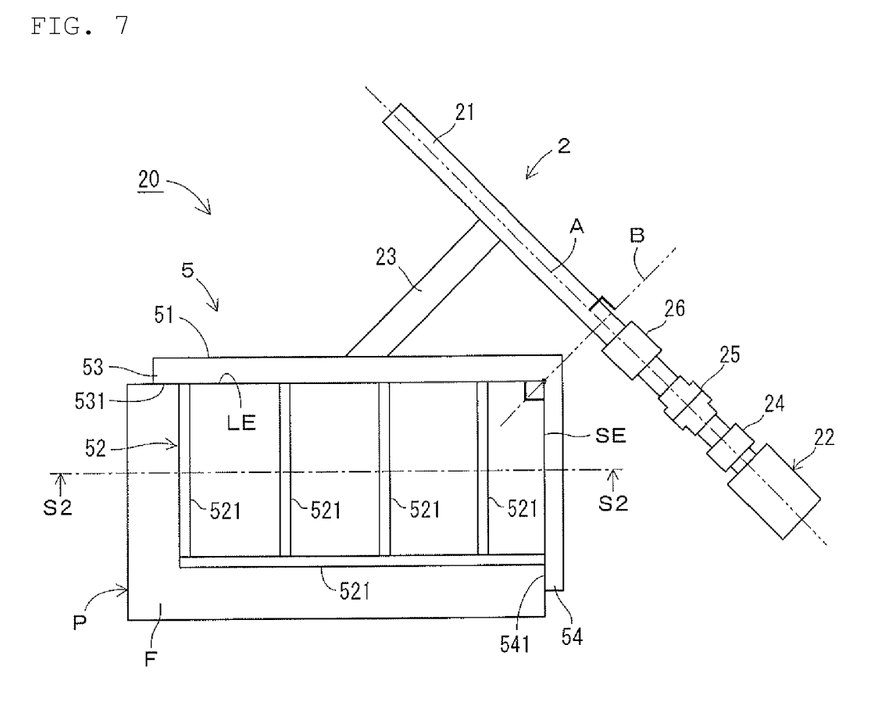
FIG. 7 is a whole plan view of a turnover device of a liquid crystal panel showing a variation of the present invention.
Figure 8:
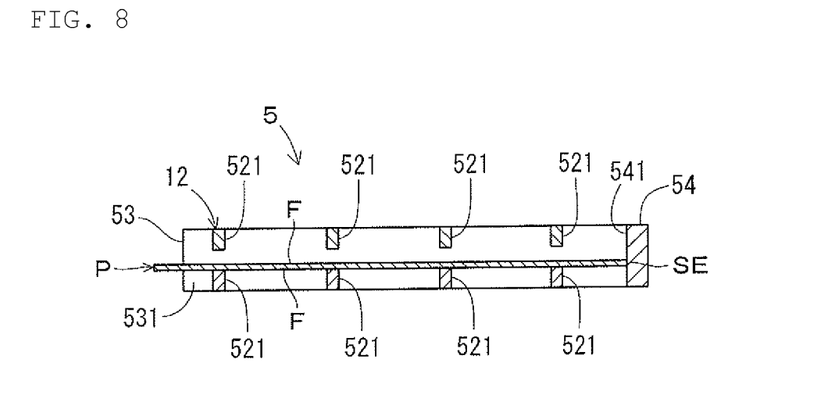
FIG. 8 is a cross-sectional view taken on a S2-S2 arrow of FIG. 7.

Like a turnover device 20 of a liquid crystal panel in another embodiments shown in FIGS. 7 and 8, plural pairs of panel face touching portions 521 opposed to each other may be arranged in a panel face supporting portion 52 of a panel holding portion 5 spacing at regular intervals in the fixed state without any opening and closing system. Alternatively, the plural pairs of panel face touching portions 521 configured to directly support both sides of a panel face F of a liquid crystal panel P may be simply composed of a rod material. This makes it possible to simplify and reduce the panel holding portion 5 in weight.

Like the turnover device 20, a supporting arm 53 of a panel long edge having a long edge touching portion 531 configured to support a long edge LE of the panel P may be integrated with a base 51 of the panel holding portion 5. Similarly, a supporting arm 54 of a panel short edge having a short edge touching portion 541 configured to support a short edge SE of the panel P may be integrated with the base 51 of the panel holding portion 5. Alternatively, the supporting arm 53 may be integrated with the supporting arm 54.

Like the turnover device 20 of the present invention, the plural pairs of panel face touching portions 521 configured to support both sides of the panel face F of the panel P may be attached to the base 51 via the supporting arm 53. Alternatively, the panel face touching portions 521 may be attached to the base 51 via the supporting arm 54. This enables to enhance rigidity of the panel holding portion 5.

In the aforementioned embodiment of the present invention, as shown in FIG. 2, while the rotation shaft 21 of the driving portion 2 is fixed by coupling to the base 11 of the panel holding portion 1 via the connecting member 23, it should be understood that the present invention is not limited to this but the rotation shaft 21 may be directly fixed to the base 11. Moreover, in the present invention, the shaft center A of the rotation shaft 21 may simply form a right angle with the bisector B to divide the angle formed by the long edge touching portion 131 of the supporting arm 13 and the short edge touching portion 141 of the supporting arm 14 in the panel holding portion 1. Typically, the rotation shaft 21 may be located in such a position that the shaft center A of the rotation shaft 21 may pass through the center of gravity of the panel P to be turned over or the center of gravity in the panel holding portion 1 holding the panel P. It is possible to variously make design changes of the position where the rotation shaft 21 is located in view of inertial force of the panel P or the panel holding portion 1.

While a servomotor is used as the actuator 22 for turnover configured to drive the rotation shaft 21 in the aforementioned embodiment, a fluid pressure cylinder or the like configured to drive the rotation shaft 21 via an oscillation lever may be used as the actuator 22 for turnover.

The present invention may be carried out in a form where various modifications, changes, and variations are made based on the knowledge of those skilled in the art without departing from the spirit and the scope of the invention. Any invention specified matters may be carried out in the form to be replaced by the other technology within the scope where identical operation or effects are generated. And the integrally configured invention specified matter may be composed of a plurality of members and the invention may be carried out in a form where the specified matter is composed of a plurality of members.

This application claims priority from Japanese Patent Application No. 2011-118563, which is incorporated herein by reference.

There has thus been shown and described a novel turnover device of a liquid crystal panel which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A turnover device of a liquid crystal panel configured to turn over a rectangle-shaped liquid crystal panel in a horizontal position, comprising:
    a panel holding portion configured to hold the liquid crystal panel; and a driving portion configured to rotate the panel holding portion about a horizontal shaft, the panel holding portion comprises: a base; a panel face supporting portion attached to the base, the panel face supporting portion having a pair of or plural pairs of panel face touching portions being opposed to each other configured to support both panel faces of the liquid crystal panel; a first supporting arm of a panel long edge attached to the base, the first supporting arm having a long edge touching portion configured to support a long edge of the liquid crystal panel along the long edge; and a second supporting arm of a panel short edge attached to the base, the second supporting arm having a short edge touching portion configured to form a right angle with the long edge touching portion of the first supporting arm of the panel long edge and support a short edge of the liquid crystal panel along the short edge, the driving portion comprises: a rotation shaft attached to the base of the panel holding portion, the rotation shaft being configured to form a right angle with a bisector to divide an angle formed by the long edge touching portion of the first supporting arm of the panel long edge and the short edge touching portion of the second supporting arm of the panel short edge; and an actuator for turnover configured to rotate and drive the rotation shaft.

2. The turnover device according to claim 1, wherein the panel face supporting portion of the panel holding portion includes an opening and closing system configured to open and close by causing the pair of or the plural pairs of panel face touching portions to relatively approach and distance.

3. The turnover device according to claim 2, wherein the opening and closing system comprises: a link member rotatably supported in the base of the panel holding portion; a movable member attached to a rotation end of the link member, the movable member having the panel face touching portions; and an opening and closing actuator attached to the base, the opening and closing actuator is configured to rotate and drive the link member.

4. The turnover device according to claim 1, wherein the panel face touching portions are respectively composed of a rotator rotatably supported in the panel face supporting portion.

5. The turnover device according to claim 2, wherein the panel face touching portions are respectively composed of a rotator rotatably supported in the panel face supporting portion.

6. The turnover device according to claim 3, wherein the panel face touching portions are respectively composed of a rotator rotatably supported in the panel face supporting portion.

* * * * *